T. HARBER.
HOSE CLAMP.
APPLICATION FILED JAN. 31, 1907.
912,955.
Patented Feb. 16, 1909.
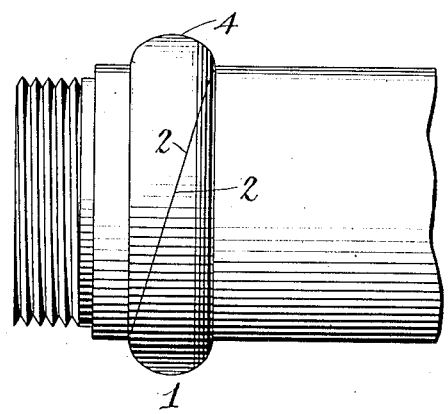
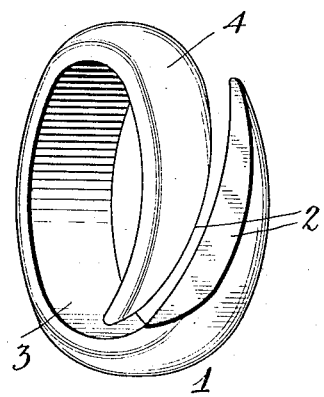
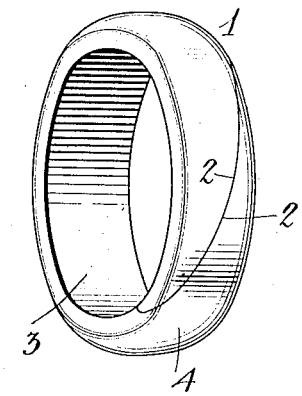
Witnesses
Inventor
Thomas Harber
by
Attorneys

UNITED STATES PATENT OFFICE.

THOMAS HARBER, OF GRAY, KENTUCKY, ASSIGNOR OF ONE-HALF TO R. I. GRAY, OF GRAY, KENTUCKY.

HOSE-CLAMP.

No. 912,955.  Specification of Letters Patent.  Patented Feb. 16, 1909.

Application filed January 31, 1907. Serial No. 355,072.

*To all whom it may concern:*

Be it known that I, THOMAS HARBER, a citizen of the United States, residing at Gray, in the county of Knox and State of Kentucky, have invented certain new and useful Improvements in Hose-Clamps; and I do declare the following to be a full, clear, and exact description of the invention, such as will enable others skilled in the art to which it appertains to make and use the same.

This invention relates to improvements in hose clamps.

The object of the invention is to provide a hose clamp adapted to be quickly and easily applied to a hose to clamp the end of the same to a nozzle or coupling.

A further object of the invention is to provide a device of this character which will be simple, strong, durable, and inexpensive in construction, efficient and reliable in operation and well adapted for the purpose for which the same is designed.

With the foregoing and other objects in view, the invention consists of certain novel features of construction, combination and arrangement of parts, as will be hereinafter described and claimed.

In the accompanying drawings,—Figure 1 is a side view of a section of hose and a portion of a coupling, showing the application of the invention thereto; Fig. 2 is a perspective view of the clamp when open; Fig. 3 is a similar view illustrating the appearance of the clamp when closed.

Referring more particularly to the drawings, a clamp 1 is shown which consists of a ring-like band split on a line oblique to the plane of the body thereof to provide a scarf joint with its overlapping end portions correspondingly inclined on their meeting faces, which faces lie in close contact when the clamp is applied. The terminals of these overlapping portions are made thin to adapt them to lie close against the respective edges of the ring and disposed in planes continuous with the respective side edges of the ring thereby preserving the cross sectional contour of the body of the ring throughout and presenting a smooth unbroken surface at its edges to avoid accidental opening of the ring-like clamp by engagement of its ends with an obstruction.

The clamp here shown preferably has a substantially flat inner wall 3 and a convex outer wall 4. In applying the ring to a hose, said ring is engaged therewith when in open position as shown in Fig. 2 after which the ends of the clamp are hammered together, thus drawing the inner flat wall of the ring into tight engagement with the hose and thereby tightly clamping the hose into engagement with a coupling or nozzle to which the hose is to be attached.

Various changes in the form, proportion and the minor details of construction may be resorted to without departing from the principle or sacrificing any of the advantages of the invention, as defined in the appended claim.

Having thus described my invention, what I claim as new and desire to secure by Letters-Patent, is:—

In combination with a hose and a hose coupling, a clamping ring of slightly greater diameter than the hose to be coupled made from a single piece of thin spring metal split obliquely to the plane of its body and bent into the required form with its split ends in spaced relation, the split ends of the ring being adapted to be hammered together after having been placed upon the hose to cause the clamping ring to tightly clamp the latter to the coupling.

In testimony whereof I have hereunto set my hand in presence of two subscribing witnesses.

THOMAS HARBER.

Witnesses:
 J. T. GRAY,
 J. A. BARTON.